United States Patent [19]
Rhodes

[11] 3,971,646
[45] July 27, 1976

[54] STIRRING OF MOLTEN GLASS

[75] Inventor: William Jackson Rhodes, Prescot, England

[73] Assignee: Pilkington Brothers Limited, St. Helens, England

[22] Filed: Jan. 8, 1975

[21] Appl. No.: 539,569

[30] Foreign Application Priority Data
Jan. 11, 1974 United Kingdom................. 1461/74

[52] U.S. Cl................................. 65/157; 65/32; 65/134; 65/178; 65/374 M
[51] Int. Cl.²............................................ C03B 5/18
[58] Field of Search............. 65/178, 179, 180, 134, 65/32, 157

[56] References Cited
UNITED STATES PATENTS

| | | | |
|---|---|---|---|
| 1,810,736 | 6/1931 | Soubier............................. | 65/178 X |
| 3,230,060 | 1/1966 | Lipmann................................. | 65/32 |
| 3,233,993 | 2/1966 | Weidel.............................. | 65/178 X |
| 3,367,761 | 2/1968 | Zitkus................................... | 65/178 |
| 3,656,924 | 4/1972 | Chapman et al.................. | 65/134 X |
| 3,883,340 | 5/1975 | French et al........................ | 65/178 X |

*Primary Examiner*—S. Leon Bashore
*Assistant Examiner*—Frank W. Miga
*Attorney, Agent, or Firm*—Sughrue, Rothwell, Mion, Zinn & Macpeak

[57] ABSTRACT

A stirrer for stirring molten glass comprises a stirring member for immersion in molten glass, a rotary shaft extending upwardly from the stirring member so that in use the shaft may extend above the molten glass and connect the stirring member to a drive device, a platinum or platinum alloy hollow casing surrounding the rotary shaft in spaced relationship thereto, the casing terminating above the stirring member, and separate inlet and outlet means in the casing for introducing and removing a flow of inert gas through the space between the casing and the shaft.

12 Claims, 2 Drawing Figures

STIRRING OF MOLTEN GLASS

BACKGROUND OF THE INVENTION

The present invention relates to stirrers and more particularly to stirrers for stirring molten glass.

It is known to stir molten glass in a glass melting tank by use of stirrers which pass down through openings in the roof of the glass tank or furnace, down through the atmosphere above the molten glass and into the molten glass. The supporting and driving means for the stirrers is located outside the furnace and is thus protected from the high temperature and atmosphere within the furnace. Difficulties arise in manufacturing the parts of the stirrers which are located within the molten glass or atmosphere within the furnace as they must withstand the corrosive nature of the molten glass and of the atmosphere. Molybdenum has been used in the manufacture of stirrers but molybdenum is readily attacked by oxygen and difficulties have arisen with parts of the stirrer exposed to the atmosphere within the glass furnace. In view of this proposals have previously been made to clad stirrers totally with a platinum coating. Platinum is not seriously affected by the oxygen although some volatisation occurs. However, platinum is liable to attack due to the fact that the presence of any aluminium in the molten glass results in silicon attack. Aluminium can be present as a contaminant in batch materials.

SUMMARY OF THE INVENTION

The present invention provides a stirrer for stirring molten glass which stirrer comprises a stirring member for immersion in molten glass, a rotary shaft extending upwardly from the stirring member so that in use the shaft may extend above the molten glass and connect the stirring member to a drive device, a platinum or platinum alloy hollow casing surrounding the rotary shaft in spaced relationship thereto, the casing terminating above the stirring member, and separate inlet and outlet means in the casing for introducing and removing a flow of inert gas through the space between the casing and the shaft, the shaft and stirring member being formed of a material resistant to attack by molten glass.

By use of the inert gas within the casing, it is possible to form the shaft and stirring member of material which is resistant to attack by molten glass but susceptible to attack by the atmosphere above the molten glass under the operating conditions of the stirrer.

The material used for the shaft and stirrer is preferably molybdenum, though other materials fulfilling the criteria set out above include tungsten and carbon. The inert gas is substantially free of oxygen so as not to attack the molybdenum and is preferably nitrogen or argon.

In the preferred construction using molybdenum the part of the stirrer which is submerged in molten glass is formed of molybdenum but the molybdenum components extending through the atmosphere in the furnace are protected by the inert gas contained within the platinum or platinum alloy casing. Similarly the platinum or platinum alloy casing will, in use, only just project into the molten glass so as to reduce the difficulties of platinum corrosion due to the presence of aluminium.

Preferably the inlet means is at the upper end of the casing and the outlet means is adjacent the lower end of the casing.

Preferably the outlet means is restricted to permit only a slow rate of escape of gas from the casing. The casing preferably has one or more capillary outlets at its lower end to form the outlet means.

Preferably the lower end of the casing is open and the said outlet means are provided in the side wall of the casing, whereby the open end of the casing may be immersed in molten glass with the outlet means above the molten glass surface.

Preferably the upper end of the rotary shaft is coupled to a further drive device, the coupling being at least partially located within a chamber open at its lower end and connected to the said casing, whereby the interior of the chamber communicates with the space between the casing and the shaft.

Preferably the chamber is provided with a gas inlet passage. In use, the gas inlet passage is connected to a source of substantially oxygen free inert gas, preferably nitrogen.

The said further drive shaft preferably extends above the chamber and passes through a wall of the chamber in gas tight manner. The coupling may include an intermediate connecting member, connected at its upper end to the further drive shaft in the chamber and connected at its lower end to the said rotary shaft. The connection to the rotary shaft may be located within the upper part of said casing.

The invention includes a glass melting tank having a stirrer as aforesaid and drive means located outside the tank, the shaft and casing extending upwardly above glass level and passing through a roof of the tank to a connection with the drive means.

The invention also provides in the manufacture of glass, a method of stirring molten glass in a glass melting tank, which method comprises rotating a stirring member at the lower end of a rotary shaft and passing a current of nitrogen gas around the exterior of the shaft and within a casing of platinum or platinum alloy which surrounds the shaft and has its lower end just immersed in the molten glass, the gas flow being effected by introducing nitrogen into the casing through an inlet and removing the gas through an outlet from the casing, and the shaft and stirring member being formed of a material resistant to attack by molten glass. Preferably the stirring member and rotary shaft are formed of molybdenum.

DESCRIPTION OF THE PREFERRED EMBODIMENT

Figure 1:
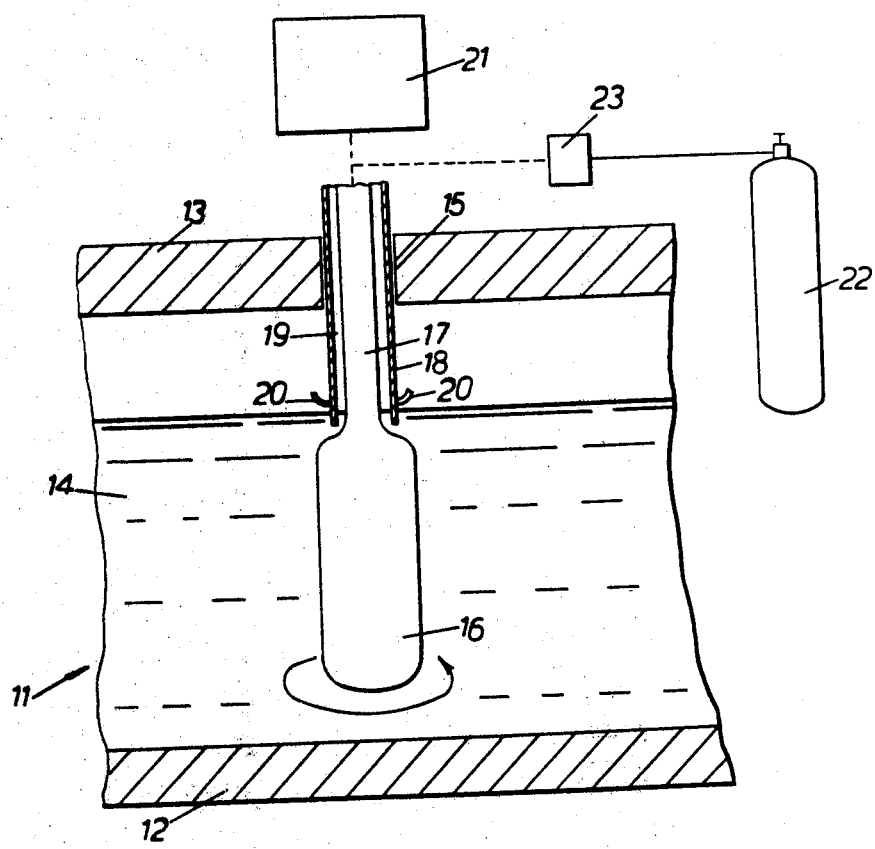
FIG. 1 is a schematic view of a stirrer in accordance with the invention located within a glass melting tank.

The arrangement shown in FIG. 1 provides a glass melting tank 11 having a refractory base 12 and a refractory roof 13. A pool of molten glass 14 lies within the furnace. The stirrer projects downwardly into the molten glass 14 through a hole 15 formed in the roof of the furnace. The stirrer consists of a stirring member 16 totally immersed in the molten glass and a rotating shaft 17 connected to the stirring member 16 and projecting upwardly through the roof of the furnace. The stirring member 16 is formed of molybdenum and may be a simple flat paddle. The shaft 17 is also formed of molybdenum and is surrounded by a platinum tube 18 spaced from the shaft 17 to provide an annular gas passage 19. The lower end of the casing 18 is open but is just immersed in the molten glass so that the glass closes the end of the casing. Two capillary outlets 20 are formed in the side walls of the casing 18 just above the surface level of the molten glass. The shaft 17 is connected to a drive device 21 and the gas passage 19 is connected to a pressurised supply 22 of nitrogen. The supply 22 is connected to the passage 19 via an oxygen removing unit 23. The unit 23 reduces the oxygen content to less than 100 parts per million. In use, the stirring member 16 and shaft 17 are rotated by the drive mechanism 21 and nitrogen is passed in a slow steady stream through the gas passage 19 and escapes through the capillary tubes 20 into the atmosphere within the furnace. The part of the stirrer which is exposed to molten glass is formed of molybdenum and thereby resists corrosion and is not affected by aluminium contamination within the molten glass. The part of the stirrer exposed to the atmosphere in the furnace consists of the platinum casing which resists oxygen corrosion. The molybdenum shaft 17 which extends above the molten glass is protected along its entire length by the surrounding nitrogen.

Figure 2:
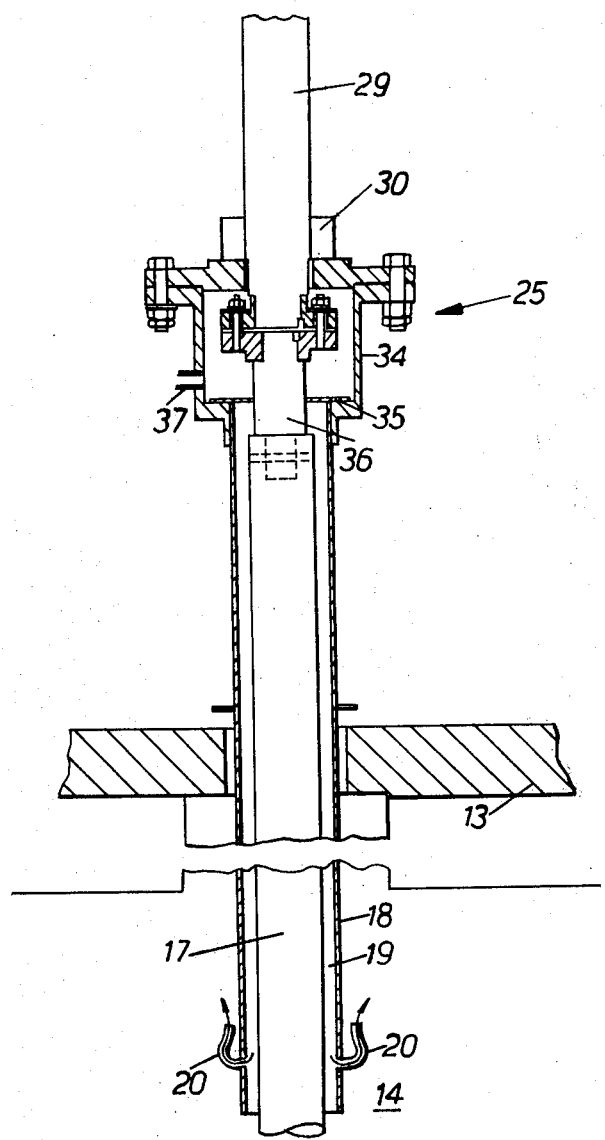
FIG. 2 shows in more detail the construction of the upper part of the stirrer and its connection to a drive mechanism.

The arrangement shown in more detail in FIG. 2 shows the upper part of the stirrer, that is the part at glass surface level and above and the stirring member 16 has been omitted. Similar parts to those shown in FIG. 1 have been marked with similar reference numerals. As is shown, the shaft 17 and casing 18 project vertically upwards through the roof 13 of the furnace to a drive coupling unit 25 located outside the furnace. A rotating drive shaft 29 formed of heat resisting stainless steel. is attached at its upper end to a driving member (not shown) which is connected to a motor (not shown). The lower end of the drive shaft 29 projects through a gas seal 30 into a closed chamber 34. The upper end of the platinum casing 18 projects into the housing 34 and has a flange 35 which retains the casing in position and is connected in gas tight manner to the housing 34. The hollow interior of the housing 34 communicates with the gas passage 19 extending within the casing 18. The upper end of the molybdenum shaft 17 terminates just below the top of the platinum casing 18 and is screw connected to an intermediate shaft 36. The shaft 36 projects into the interior of the housing 34 and is connected by two bolted flanges, forming an electrically isolated joint, to the lower end of the drive shaft 29. The housing 34 is provided with a gas inlet passage 37 which is connected to the oxygen removing unit 23 shown in FIG. 1. In this way nitrogen enters the inlet 37 and as the chamber 34 is otherwise closed, the gas passes downwardly into the gas passage 19.

By use of the arrangement described above, the nitrogen passing between the casing 18 and shaft 17 is as free of oxygen as can reasonably be obtained although it is impossible to obtain nitrogen in commercial quantities which is totally free of traces of oxygen. However, it has been found that by passing nitrogen continuously through the casing 18, the molybdenum is not attacked.

The invention is not limited to the details of the foregoing example. The tube 18 may be formed of a platinum alloy and in some cases the stirring member 16 and shaft 17 may be formed of tungsten or carbon.

I claim:

1. In a glass melting furnace, a stirrer for stirring molten glass, which stirrer comprises a stirring member for immersion in the molten glass, a rotary shaft extending upwardly from the stirring member to a roof of the furnace, the shaft being rotatably mounted and connected to a drive device arranged to rotate the stirrer, a stationary hollow casing formed of a material which contains a high percentage of platinum surrounding the rotary shaft in spaced relationship thereto, the casing extending downwardly from the roof of the furnace, terminating above the stirring member, and being separate therefrom, and separate inlet and outlet means in the casing for introducing and removing a flow of inert gas through the space between the casing and the shaft whereby the atmosphere between the shaft and the casing may be different from the atmosphere above the molten glass in the remainder of the furnace, the shaft and stirring member being formed of a material resistant to attack by molten glass and different from the material of the hollow casing.

2. A stirrer according to claim 1, in which the stirring member and rotary shaft are formed of molybdenum.

3. A stirrer according to claim 1, in which the inlet means is positioned at the upper end of the casing and the outlet means is positioned adjacent the lower end of the casing.

4. A stirrer according to claim 3, in which the outlet means comprises restricted passage means to permit only a slow rate of escape of gas from the casing.

5. A stirrer according to claim 4, in which the restricted passage means are capillary passages.

6. A stirrer according to claim 1, in which the lower end of the casing is open, the said outlet means are provided in the side wall of the casing, and the lower end of the casing extends down to and is slightly immersed in molten glass with the outlet means above the molten glass surface when the furnace is in use.

7. A stirrer according to claim 1, in which the upper end of the shaft is coupled to a further drive shaft, the coupling being at least partially located within a chamber open at its lower end and connected to the said casing, whereby the interior of the chamber communicates with the space between the casing and the shaft.

8. A stirrer according to claim 7, in which the chamber is provided with a gas inlet passage.

9. A stirrer according to claim 7 in which said further drive shaft extends above the chamber and passes through a wall of the chamber in gas tight manner.

10. A stirrer according to claim 7, in which the coupling includes an intermediate connecting member, connected at its upper end to the further drive shaft in the chamber and connected at its lower end to the said rotary shaft.

11. A stirrer according to claim 1, in which the inlet means is connected to a source of substantially oxygen free inert gas.

12. A glass melting tank having a stirrer according to claim 1 and drive means positioned outside the tank, the shaft and casing extending upwardly above glass level and passing through a roof of the tank to a connection with the drive means.

* * * * *